United States Patent
Yang

(10) Patent No.: US 9,495,071 B2
(45) Date of Patent: Nov. 15, 2016

(54) WIRELESS COMMUNICATION APPARATUS AND METHOD OF ADDING A WIDGET THEREFOR

(71) Applicant: HUIZHOU TCL MOBILE COMMUNICATION CO., LTD, Huizhou, Guangdong (CN)

(72) Inventor: Zhibing Yang, Guangdong (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 237 days.

(21) Appl. No.: 14/402,256

(22) PCT Filed: Aug. 6, 2013

(86) PCT No.: PCT/CN2013/080881
§ 371 (c)(1),
(2) Date: Nov. 19, 2014

(87) PCT Pub. No.: WO2014/173036
PCT Pub. Date: Oct. 30, 2014

(65) Prior Publication Data
US 2015/0106752 A1    Apr. 16, 2015

(30) Foreign Application Priority Data
Apr. 23, 2013 (CN) .......................... 2013 1 0143790

(51) Int. Cl.
*G06F 3/048* (2013.01)
*G06F 3/0481* (2013.01)
(Continued)

(52) U.S. Cl.
CPC ......... *G06F 3/04817* (2013.01); *G06F 3/0486* (2013.01); *G06F 3/04842* (2013.01); *G06F 3/04845* (2013.01); *G06F 3/04883* (2013.01); *G06F 9/4443* (2013.01); *G06F 2203/04806* (2013.01)

(58) Field of Classification Search
CPC .................................................. G06F 3/04817
USPC .......................................................... 715/763
See application file for complete search history.

(56) References Cited

U.S. PATENT DOCUMENTS 7,707,514 B2 *  4/2010  Forstall ................. G06F 3/0486
715/741
8,881,062 B2 * 11/2014  Kim .................... G06F 3/04883
715/817
(Continued)

FOREIGN PATENT DOCUMENTS

CN    101853158 A    10/2010
CN    102736903 A    10/2012
(Continued)

*Primary Examiner* — William Titcomb
(74) *Attorney, Agent, or Firm* — Ladas & Parry LLP

(57) ABSTRACT

A method of adding a widget in a wireless communication apparatus is provided. The method comprises: listing an application icon comprising the widget to be an editable mode according to a preset operation of a user; zooming in or out the application icon according to an editing operation of the user on the application icon; adding a corresponding widget type to a desktop when monitoring that the application icon comprising the widget is zoomed in or out to the corresponding widget type. A wireless communication apparatus is further provided. In this way, the present disclosure can improve the efficiency of adding the widget and the user's experiences.

14 Claims, 4 Drawing Sheets

(51) Int. Cl.
  *G06F 9/44* (2006.01)
  *G06F 3/0484* (2013.01)
  *G06F 3/0486* (2013.01)
  *G06F 3/0488* (2013.01)

(56) References Cited

U.S. PATENT DOCUMENTS

| | | | |
|---|---|---|---|
| 9,317,195 B1* | 4/2016 | Grechishkin | G06F 3/0486 |
| 9,342,324 B2* | 5/2016 | Wu | G06F 9/4443 |
| 9,348,509 B2* | 5/2016 | Ahn | G06F 3/041 |
| 9,367,206 B2* | 6/2016 | Koo | G06F 3/04883 |
| 2011/0302135 A1* | 12/2011 | Prophete | G06F 17/30575 707/634 |
| 2011/0314373 A1* | 12/2011 | Prophete | G06F 8/34 715/273 |
| 2013/0011819 A1* | 1/2013 | Horseman | A61B 5/6887 434/257 |
| 2013/0055156 A1 | 2/2013 | Miyamoto et al. | |
| 2015/0286388 A1* | 10/2015 | Jeon | G06F 3/04817 715/736 |

FOREIGN PATENT DOCUMENTS

| | | |
|---|---|---|
| CN | 103034396 A | 4/2013 |
| CN | 103051965 A | 4/2013 |

\* cited by examiner

Apparatus
WIRELESS COMMUNICATION APPARATUS AND METHOD OF ADDING A WIDGET THEREFOR

RELATED APPLICATION

This application is a national phase entry under 35 USC 371 of International Patent Application No. PCT/CN2013/080881 filed on 06 Aug. 2013, which was published on 30 Oct. 2014 with International Publication Number WO 2014/173036A1, which claims priorty from Chinese Patent Application No. 201310143790.4 filed on 23 Apr. 2013, the disclosures of which are incorporated in their entirety by reference herein.

FIELD OF THE INVENTION

The present disclosure relates to the technical field of communication technologies, and more particularly, to a wireless communication apparatus and a method of adding a widget therefore.

BACKGROUND OF THE INVENTION

Owing to the development of wireless communication apparatuses, now we can install various kinds of application software in the wireless communication apparatuses depending on the individual demands, e.g., the communication software MSN, QQ, games, music playing software, map software, graphic processing applications, file processing applications and so on. Furthermore, as the kinds of applications become diversified, the number of applications installed in the wireless communication apparatuses also becomes increasingly greater. Therefore, to facilitate the users' operations, widgets of various applications are disposed on the desktop in many systems so that the applications can be operated directly through use of the widgets. For example, a music playing widget allows a user to directly view information and lyrics of a piece of music and perform controlling operations on the music being played. Widgets of different applications are different depending on their functions as well as occupied areas and aspect ratios, and even if the same kind of application desktop widgets may also be categorized into different types, which generally are the simple type (4*1), the complex type (4*4) and other types (e.g., 3*2). For example, the music playing widgets are categorized into the simple type and the complex type depending on the occupied areas. The simple type occupies a smaller desktop space so that more application plug-ins can be disposed on the desktop, but it comprises fewer functions (e.g., it can only be used for music playing control but cannot display the lyrics); and the complex type occupies a larger desktop space which makes the number of widgets that can be disposed on the desktop smaller, but it comprises more functions (e.g., it can display the music lyrics). Therefore, the widgets bring about great conveniences to the users, and the users often need to add widgets of applications or change the type of the widgets in the system.

However, the operations of adding a widget or change the type of a widget of an application are relatively complex. Specifically, the user firstly has to enter into a widget list of applications, and then select a corresponding widget from the widget list. Further, the user who wants to change the type of a widget of a certain application on the current desktop also needs to enter into the widget list and to select a different type before deleting the original widget. This way of adding a widget is relatively complex and inefficient.

SUMMARY OF THE INVENTION

The present disclosure mainly provides a wireless communication apparatus and a method of adding a widget therefor, which can solve the problem that the efficiency of adding a widget in a wireless communication apparatus is poor.

To solve the above technical problems, a technical solution adopted in the present disclosure is to provide a method of adding a widget in a wireless communication apparatus, which comprises: displaying an application icon comprising the widget and a common application icon in different manners; listing the application icon comprising the widget to be an editable mode according to a preset operation performed by a user on the application icon of the wireless communication apparatus which comprises the widget; zooming in or out the application icon comprising the widget according to an editing operation of the user on the application icon comprising the widget; monitoring a size of the application icon comprising the widget; and adding a corresponding widget type to a desktop of the wireless communication apparatus when monitoring that the application icon comprising the widget is zoomed in or out to the corresponding widget type; wherein the preset operation is a long-press operation or a double-clicking operation, and the editing operation is a dragging operation.

The step of displaying an application icon comprising the widget and a common application icon in different manners specifically comprises: displaying the application icon comprising the widget in a highlighted, flashing or animation manner, and displaying the common application icon in a normal manner.

The step of adding the corresponding widget type to the desktop of the wireless communication apparatus specifically comprises: comparing a size of an area necessary for the corresponding widget type with a size of an available area of the desktop; and adding the corresponding widget type to the desktop if the area necessary for the corresponding widget type is smaller than or equal to the available area of the desktop.

The step of adding the corresponding widget type to the desktop if the area necessary for the corresponding widget type is smaller than or equal to the available area of the desktop further comprises: if the area necessary for the corresponding widget type is smaller than the available area of the desktop, displaying at least one said widget type, of which the area necessary is smaller than the available area of the desktop, for the user selecting to add the widget type that is needed; the method further comprises the following step after the step of comparing a size of an area necessary for the corresponding widget type with a size of an available area of the desktop: prompting that the adding operation of the user fails if the area necessary for the corresponding widget type is larger than the available area of the desktop.

To solve the aforesaid technical problem, another technical solution adopted in the present disclosure is to provide a method of adding a widget in a wireless communication apparatus, which comprises: listing an application icon comprising the widget to be an editable mode according to a preset operation performed by a user on the application icon of the wireless communication apparatus which comprises the widget; zooming in or out the application icon comprising the widget according to an editing operation of the user on the application icon comprising the widget;

monitoring a size of the application icon comprising the widget; and adding a corresponding widget type to a desktop of the wireless communication apparatus when monitoring that the application icon comprising the widget is zoomed in or out to the corresponding widget type.

The method further comprises the following step before the step of listing the application icon comprising the widget to be an editable mode according to a preset operation performed by a user on the application icon of the wireless communication apparatus which comprises the widget: displaying the application icon comprising the widget and a common application icon in different manners.

The step of displaying the application icon comprising the widget and a common application icon in different manners specifically comprises: displaying the application icon comprising the widget in a highlighted, flashing or animation manner, and displaying the common application icon in a normal manner.

The step of adding a corresponding widget type to a desktop of the wireless communication apparatus specifically comprises: comparing a size of an area necessary for the corresponding widget type with a size of an available area of the desktop; adding the corresponding widget type to the desktop if the area necessary for the corresponding widget type is smaller than or equal to the available area of the desktop.

The step of adding the corresponding widget type to the desktop if the area necessary for the corresponding widget type is smaller than or equal to the available area of the desktop further comprises: if the area necessary for the corresponding widget type is smaller than the available area of the desktop, displaying at least one said widget type, of which the area necessary is smaller than the available area of the desktop, for the user selecting to add the widget type that is needed; the method further comprises the following step after the step of comparing a size of an area necessary for the corresponding widget type with a size of an available area of the desktop: prompting that the adding operation of the user fails if the area necessary for the corresponding widget type is larger than the available area of the desktop.

The preset operation is a long-press operation or a double-clicking operation, and the editing operation is a dragging operation.

To solve the aforesaid technical problems, still another technical solution adopted in the present disclosure is to provide a wireless communication system, which comprises: an application management module, being configured to list an application icon comprising the widget to be an editable mode according to a preset operation performed by a user on the application icon of the wireless communication apparatus which comprises the widget; a widget editing module, being configured to zoom in or out the application icon comprising the widget according to an editing operation of the user on the application icon comprising the widget after the application icon comprising the widget is listed to be the editable mode by the application management module; a monitoring module, being configured to monitor a size of the application icon comprising the widget when the application icon is zoomed in or out by the widget editing module; and an adding module, being configured to add a corresponding widget type to a desktop of the wireless communication apparatus when the monitoring module monitors that the application icon comprising the widget is zoomed in or out to the corresponding widget type.

The wireless communication apparatus further comprises an application displaying module, which is configured to display the application icon comprising the widget and a common application icon in different manners.

The adding module specifically comprises: a comparing unit, being configured to compare a size of an area necessary for the corresponding widget type with a size of an available area of the desktop; a processing unit, being configured to add the corresponding widget type to the desktop if the comparing unit determines that the area necessary for the corresponding widget type is smaller than or equal to the available area of the desktop.

The adding module further comprises: a first prompting unit, being configured to display at least one said widget type, of which the area necessary is smaller than the available area of the desktop, for the user selecting to add the widget type that is needed if the comparing unit determines that the area necessary for the corresponding widget type is smaller than the available area of the desktop, so that the corresponding widget type is added by the processing unit to the desktop; a second prompting unit, being configured to prompt that the adding operation of the user fails if the area necessary for the corresponding widget type is larger than the available area of the desktop.

The present disclosure zooms in or out an application icon comprising a widget by performing an editing operation on the application icon comprising the widget, and, when it is monitored that the application icon comprising the widget is zoomed in or out to the corresponding widget type, adds the corresponding widget type to the desktop. As compared to the prior art, the present disclosure does not need to enter into a widget list to search for and select a widget type. Thereby, the present disclosure can improve the efficiency of adding a widget and the user's experiences.

DETAILED DESCRIPTION OF THE INVENTION

The present disclosure will be detailed hereinbelow with reference to the attached drawings and the embodiments.

Figure 1:
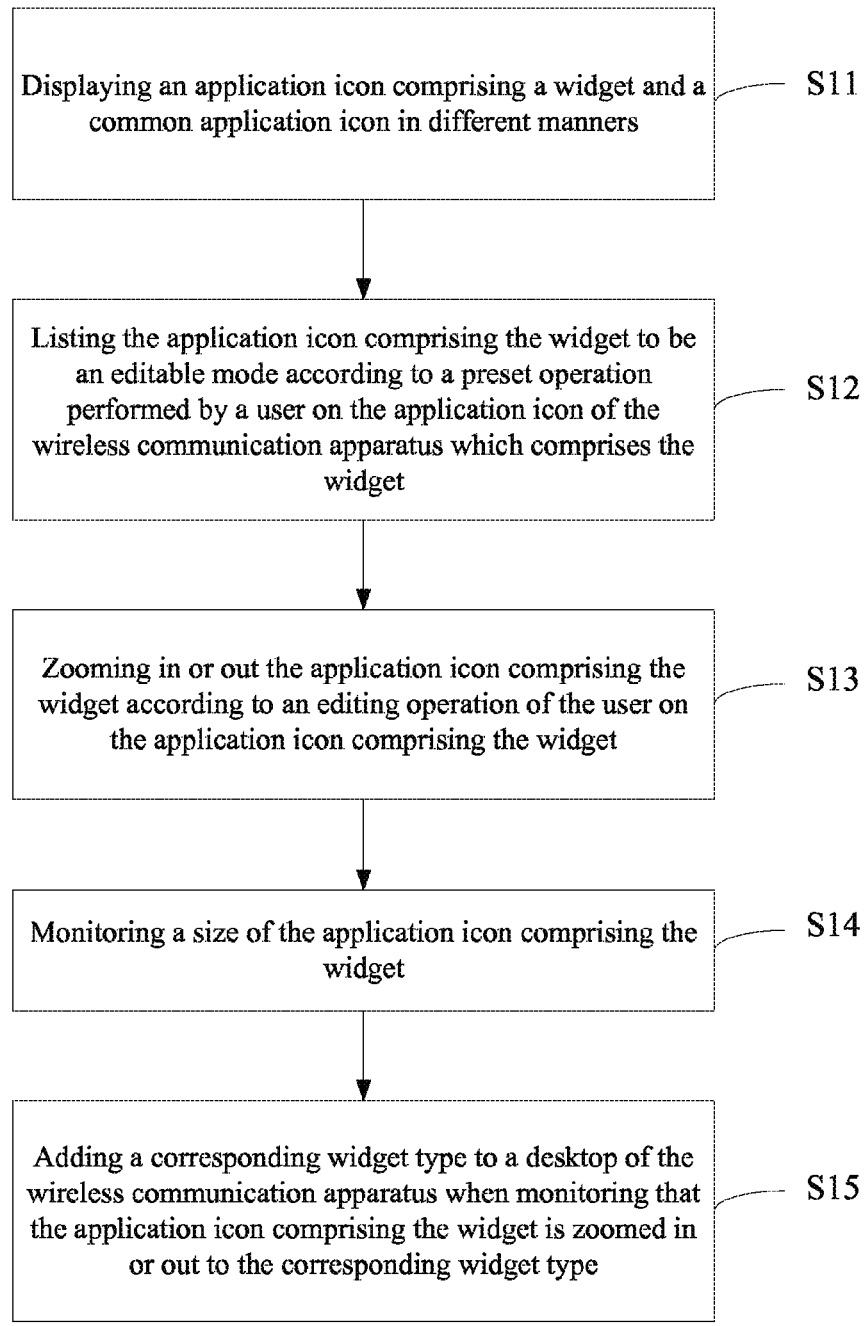
FIG. 1 is a schematic flowchart diagram of an embodiment of a method of adding a widget according to the present disclosure.

Refer to FIG. 1, which shows a schematic flowchart diagram of an embodiment of a method of adding a widget according to the present disclosure. The method of adding a widget according to the present disclosure may be used in a wireless communication apparatus, for example, a cell phone, a personal computer or the like, but the present disclosure has no limitation on this. The method of adding a widget according to the present disclosure comprises the following steps.

Step S11: displaying an application icon comprising the widget and a common application icon in different manners.

In wireless communication apparatuses, all the applications have corresponding icons and names, which are displayed in an application menu in a certain sequence. The sequence may be decided according to the symbol string UNICODE codes of the application names, or according to the types, the edition and dragging of the user, the usage frequencies, or the installation sequence of the applications.

It should be appreciated that, when installing or updating an application, the user firstly monitors whether the application comprises a widget and then adds the application to the application menu, and then applications can be displayed according to any of the aforesaid displaying sequences. In other words, this embodiment displays the installed or upgraded application according to different sequences so that the user can conveniently know the applications that are installed or upgraded recently; and in case a malicious application or a virus application is installed without being known by the user, there may also be clear prompts to the user in the main menu or the list. This improves the efficiency of the user in using the applications and can further prevent the wireless communication apparatus from being infected at the same time.

In this embodiment, the application icon comprising the widget may be displayed in a highlighted, flashing or animation manner, and a common application icon may be displayed in a normal manner at the same time so that the application icon comprising the widget and the common application icon can be distinguished from each other. For example, an application "Chinese Lunar Calendar" comprises a widget and an application "UCWEB" is a common application, so the icon of the application "Chinese Lunar Calendar" may be displayed in a highlighted manner and the application "UCWEB" may be displayed in a normal manner. Further, a plurality of static pictures comprised in the application "Chinese Lunar Calendar" may also be saved beforehand, and then the plurality of static pictures are displayed cyclically according to a certain frequency so that a flashing effect of displaying can be achieved; and the application "UCWEB" is displayed in a normal manner. Of course, the names of the applications may also be displayed in a highlighted, flashing or animation manner, which can also achieve the purpose of distinguishing the application icon comprising the widget from the normal application icon, and the present disclosure has no limitation on this. It should be appreciated that, because the widgets comprised in the applications may be of more than one type (e.g., a 4*1 type and a 4*2 type), the present disclosure may also display the types of the widgets comprised in the applications. In this way, it may be more convenient for the user to know the information of the widgets of the applications and to add the widgets.

Step S12: listing the application icon comprising the widget to be an editable mode according to a preset operation performed by the user on the application icon of the wireless communication apparatus which comprises the widget.

In this embodiment, the preset operation may be a long-press operation, and of course, may also be a double-clicking operation and etc.; and those skilled in the art can set the preset operation according to the specific needs thereof. Through the preset operation, the application icon comprising the widget enters into the editable mode so that the user can perform further operations on the application icon comprising the widget.

Step S13: zooming in or out the application icon comprising the widget according to an editing operation of the user on the application icon comprising the widget.

In this embodiment, the editing operation is a dragging operation. Specifically, after the application icon comprising the widget enters into the editable mode, the user can drag the edges thereof to zoom in or out the application icon comprising the widget. Of course, the editing operation may also be a double-clicking operation or the like, and those skilled in the art can set the editing operation depending on the specific needs thereof.

Step S14: monitoring a size of the application icon comprising the widget.

As described above, an application may comprise widgets of a plurality of types, and the widgets of different types have different sizes and provide different functions. When it is monitored that the size of the application icon comprising the widget is of the corresponding widget type, step S15 is executed.

Step S15: adding the corresponding widget type to the desktop of the wireless communication apparatus when monitoring that the application icon comprising the widget is zoomed in or out to the corresponding widget type.

Figure 2:
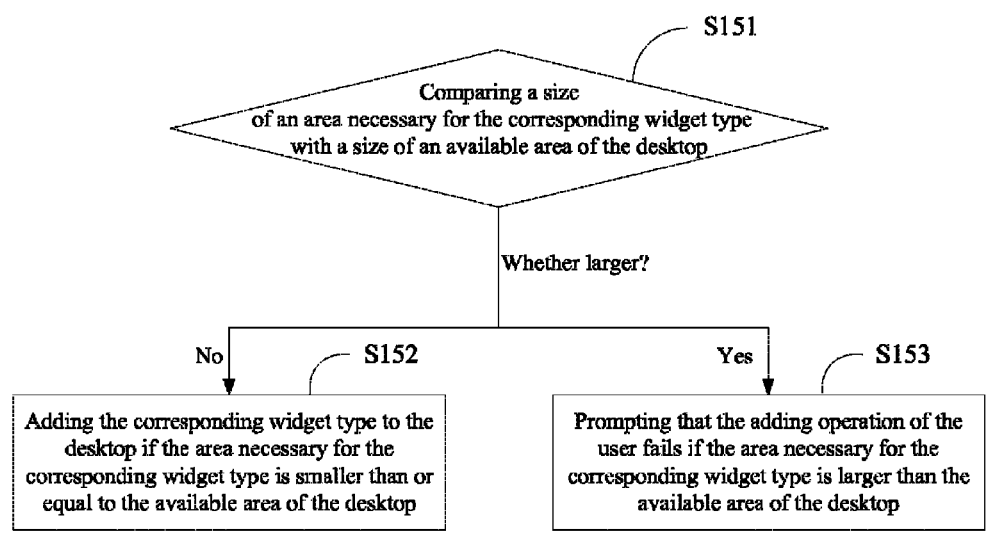
FIG. 2 is a detailed flowchart diagram of a process of adding a widget to a desktop in an embodiment of the method of adding a widget according to the present disclosure.

Because the desktop of the wireless communication apparatus can also display shortcuts, folders or the like of other applications in addition to the widgets, the available area of the desktop may be not enough to contain the widgets. Therefore, a comparison of an area necessary for the corresponding widget type with an available area of the desktop needs to be made before the widget is added to the desktop, as shown in FIG. 2. FIG. 2 is a detailed flowchart diagram of a process of adding a widget to a desktop in an embodiment of the method of adding a widget according to the present disclosure. The detailed steps of the process of adding the widget to the desktop include:

Step S151: comparing a size of an area necessary for the corresponding widget type with a size of an available area of the desktop.

If the size of the area necessary for the corresponding widget type is smaller than or equal to the size of the available area of the desktop, step S152 is executed; and if the size of the area necessary for the corresponding widget type is smaller than or equal to the size of the available area of the desktop, step S153 is executed.

Step S152: adding the corresponding widget type to the desktop if the area necessary for the corresponding widget type is smaller than or equal to the available area of the desktop.

Specifically, if the area necessary for the corresponding widget type is smaller than the available area of the desktop, then at least one said widget type, of which the area necessary is smaller than the available area of the desktop, is displayed for the user selecting to add the widget type that is needed. For example, the application "Chinese Lunar Calendar" comprises widgets of a 4*1 type, a 4*2 type and a 4*3 type; and if the areas necessary for the widgets of the 4*1 type and the 4*2 type are both smaller than the available area of the desktop, then the widgets of the 4*1 type and the 4*2 type are displayed for choice by the user. If the user chooses the widget of the 4*1 type, then the widget is added to the desktop.

If the area necessary for the corresponding widget type is equal to the available area of the desktop, then the corresponding widget type is added to the desktop.

Step S153: prompting that the adding operation of the user fails if the area necessary for the corresponding widget type is larger than the available area of the desktop.

If the area necessary for the corresponding widget type is larger than the available area of the desktop, then it means that the area necessary for any one of the widget types of the application is larger than the available area of the desktop and the current desktop is unable to contain the corresponding widget type. Therefore, the user is prompted that the adding operation fails and may be further prompted to add the corresponding widget type to other desktops.

The method of adding a widget according to the embodiment of the present disclosure firstly displays an application icon comprising the widget and a common application in different manners, and then directly performs an editing operation on the application icon comprising the widget so as to add the widget to the desktop. This eliminates the need of entering into a widget list to select a widget therefrom, thus improving the efficiency of adding the widget and the user's experiences. Furthermore, a comparison of an area necessary for the widget type to be added with an available area of the desktop is made firstly before the adding operation, which can prevent failure of the adding operation caused when the available area of the desktop is not enough for containing the widget and thus improves the accuracy of the adding operation.

Figure 3:
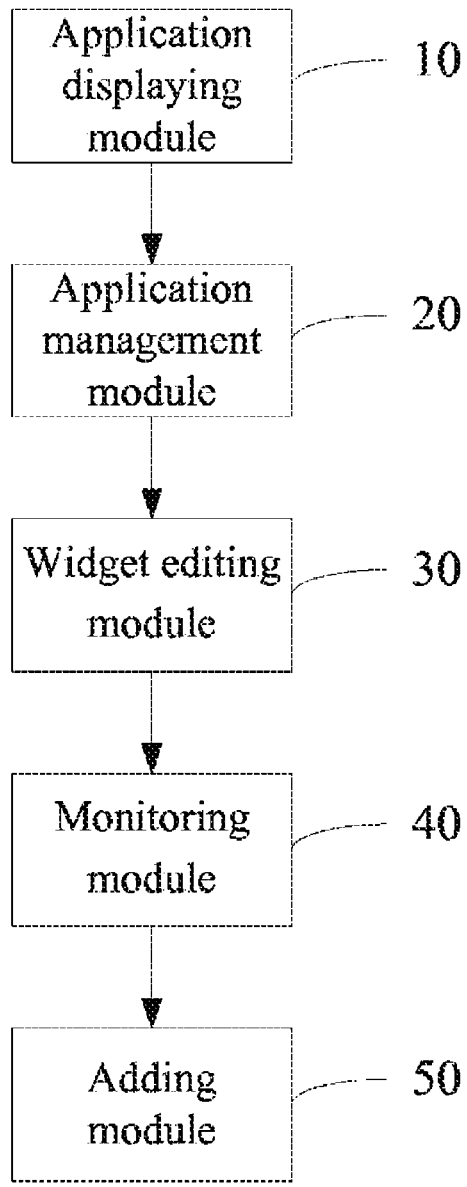
FIG. 3 is a schematic structural view of an embodiment of a wireless communication system according to the present disclosure.

Refer to FIG. 3, which shows a schematic structural view of an embodiment of a wireless communication apparatus according to the present disclosure. The wireless communication apparatus comprises but is not limited to: an application displaying module 10, an application management module 20, a widget editing module 30, a monitoring module 40 and an adding module 50. In this embodiment, the wireless communication apparatus may be a cell phone, a personal computer or the like.

The application displaying module 10 is configured to display an application icon comprising a widget and a common application icon in different manners.

Specifically, the application icon comprising the widget may be displayed in a highlighted, flashing or animation manner, and the common application icon may be displayed in a normal manner at the same time so that the application icon comprising the widget and the common application icon can be distinguished from each other. Of course, the name of the application may also be displayed in a highlighted, flashing or animation manner, which can also achieve the purpose of distinguishing the application icon comprising the widget from the common application icon; and the present disclosure has no limitation on this.

The application management module 20 is configured to list an application icon comprising the widget to be an editable mode according to a preset operation performed by a user on the application icon comprising the widget of the wireless communication apparatus.

Specifically, in this embodiment, the preset operation is a long-press operation, and of course, may also be a double-clicking operation or the like. Those skilled in the art can set the preset operation according the specific needs thereof.

The widget editing module 30 is configured to zoom in or out the application icon comprising the widget according to an editing operation of the user on the application icon comprising the widget after the application icon comprising the widget is listed to be the editable mode by the application management module 20.

Specifically, in this embodiment, the editing operation is a dragging operation, and of course, may also be a double-clicking operation; and those skilled in the art can set the editing operation according to the specific needs thereof.

The monitoring module 40 is configured to monitor a size of the application icon comprising the widget when the application icon is zoomed in or out by the widget editing module 30.

The adding module 50 is configured to add a corresponding widget type to a desktop of the wireless communication apparatus when the monitoring module 40 monitors that the application icon comprising the widget is zoomed in or out to the corresponding widget type.

Specifically, the adding module 50 comprises a comparing unit 501, a processing unit 502, a first prompting unit 503 and a second prompting unit 504.

The comparing unit 501 is configured to compare a size of an area necessary for the corresponding widget type with a size of an available area of the desktop.

Because the desktop of the wireless communication apparatus also displays shortcuts, folders or the like of other applications in addition to the widgets, the available area of the desktop may be not enough for containing the widgets. Therefore, a comparison of the area necessary for the corresponding widget type with the available area of the desktop needs to be made before the widget is added to the desktop.

The processing unit 502 is configured to add the corresponding widget type to the desktop if the comparing unit 501 determines that the area necessary for the corresponding widget type is smaller than or equal to the available area of the desktop.

Specifically, if the area necessary for the corresponding widget type is equal to the available area of the desktop, then the processing unit 502 adds the corresponding widget type to the desktop.

The first prompting unit 503 is configured to display at least one said widget type, of which the area necessary is smaller than the available area of the desktop, for the user selecting to add the widget type that is needed if the comparing unit 501 determines that the area necessary for the corresponding widget type is smaller than the available area of the desktop, so that the corresponding widget type is added by the processing unit 502 to the desktop.

For example, the application "Chinese Lunar Calendar" comprises widgets of a 4*1 type, a 4*2 type and a 4*3 type; and if the areas necessary for the widgets of the 4*1 type and the 4*2 type are both smaller than the available area of the desktop, then it is prompted that the widgets of the 4*1 type and the 4*2 type are displayed for choice by the user. If the user chooses the widget of the 4*1 type, then the processing unit 502 adds the corresponding widget type to the desktop.

The second prompting unit 504 is configured to prompt that the adding operation of the user fails if the comparing unit 501 determines that the area necessary for the corresponding widget type is larger than the available area of the desktop.

If the area necessary for the corresponding widget type is larger than the available area of the desktop, then it means that the area necessary for any one of the widget types of the application is larger than the available area of the desktop and the current desktop is unable to contain the corresponding widget type. Therefore, the user is prompted that the adding operation fails and may further be prompted to add the corresponding widget type to other desktops.

In the aforesaid way, the wireless communication apparatus according to the embodiment of the present disclosure displays an application icon comprising a widget and a common application in different manners by means of the application displaying module 10, then zooms in or out the application icon comprising the widget to the corresponding widget type by means of the widget editing module 30 and adds the corresponding widget type to the desktop directly by means of the adding module 50. This eliminates the need of entering into the widget list to select a widget therefrom. Thereby, the efficiency of adding the widget and the user's experiences is improved.

Figure 4:
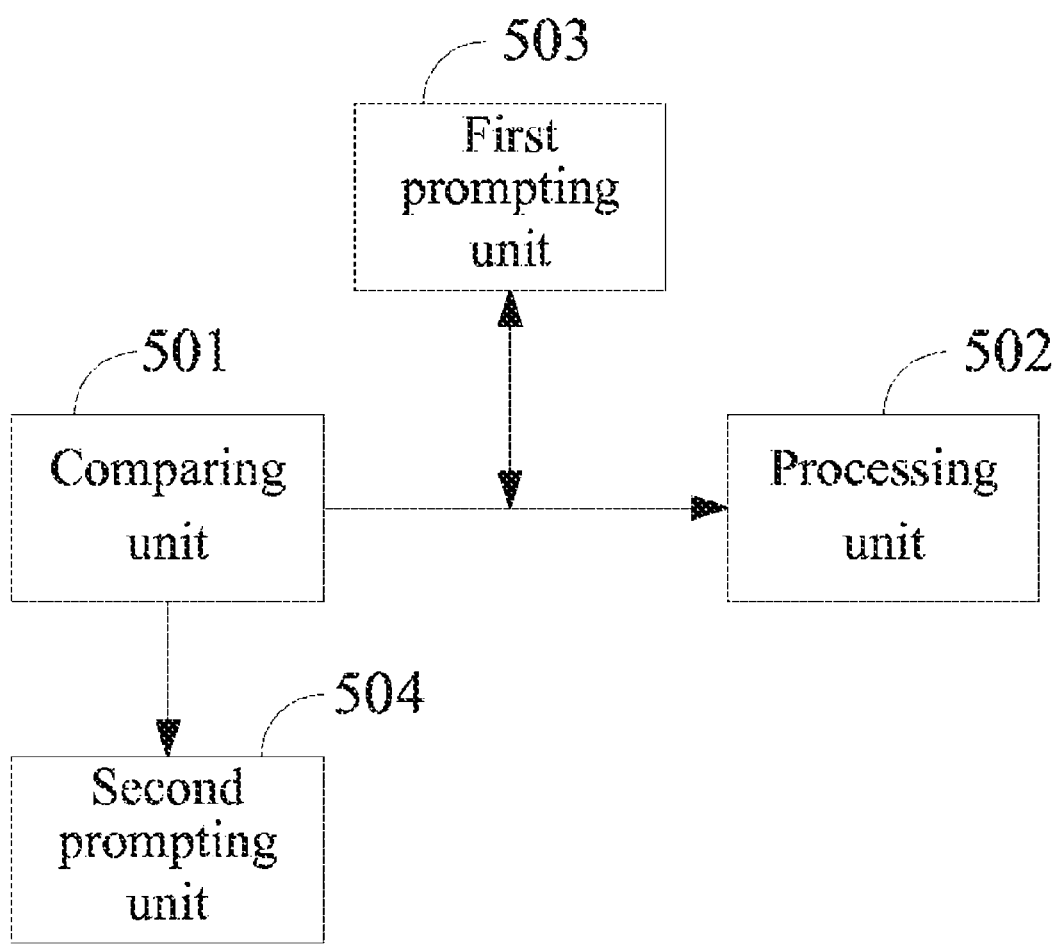
FIG. 4 is a schematic structural view of an adding module shown in FIG. 3.

Furthermore, it is apparent to those skilled in the art, the present disclosure also provides a wireless communication apparatus, which comprises a non-transitory program storage medium and a processor. The non-transitory program storage medium stores a program executed by the processor to perform the method as described in above. Furthermore, it is apparent to those skilled in the art that, various modules 10, 20, 30, 40, 50 and various units 501, 502, 503, 504 as shown in FIGS. 3-4 are software modules or software units. In another aspect, it is well-known that various software modules or software units inherently are stored in the non-transitory program storage medium and executed by the processor.

What described above are only embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

What is claimed is:

1. A method of adding a widget in a wireless communication apparatus, comprising:
    displaying an application icon comprising the widget and a common application icon in different manners;
    listing the application icon comprising the widget to be an editable mode according to a preset operation performed by a user on the application icon of the wireless communication apparatus which comprises the widget;
    zooming in or out the application icon comprising the widget according to an editing operation of the user on the application icon comprising the widget;
    monitoring a size of the application icon comprising the widget; and
    adding a corresponding widget type to a desktop of the wireless communication apparatus when monitoring that the application icon comprising the widget is zoomed in or out to the corresponding widget type;
    wherein the preset operation is a long-press operation or a double-clicking operation, and the editing operation is a dragging operation.

2. The method of claim 1, wherein the step of displaying an application icon comprising the widget and a common application icon in different manners specifically comprises:
    displaying the application icon comprising the widget in a highlighted, flashing or animation manner, and displaying the common application icon in a normal manner.

3. The method of claim 1, wherein the step of adding the corresponding widget type to the desktop of the wireless communication apparatus specifically comprises:
    comparing a size of an area necessary for the corresponding widget type with a size of an available area of the desktop; and
    adding the corresponding widget type to the desktop if the area necessary for the corresponding widget type is smaller than or equal to the available area of the desktop.

4. The method of claim 3, wherein:
    the step of adding the corresponding widget type to the desktop if the area necessary for the corresponding widget type is smaller than or equal to the available area of the desktop further comprises:
    if the area necessary for the corresponding widget type is smaller than the available area of the desktop, displaying at least one said widget type, of which the area necessary is smaller than the available area of the desktop, for the user selecting to add the widget type that is needed;
    the method further comprises the following step after the step of comparing a size of an area necessary for the corresponding widget type with a size of an available area of the desktop:
    prompting that the adding operation of the user fails if the area necessary for the corresponding widget type is larger than the available area of the desktop.

5. A method of adding a widget in a wireless communication apparatus, comprising:
    listing an application icon comprising the widget to be an editable mode according to a preset operation performed by a user on the application icon of the wireless communication apparatus which comprises the widget;
    zooming in or out the application icon comprising the widget according to an editing operation of the user on the application icon comprising the widget;
    monitoring a size of the application icon comprising the widget; and
    adding a corresponding widget type to a desktop of the wireless communication apparatus when monitoring that the application icon comprising the widget is zoomed in or out to the corresponding widget type.

6. The method of claim 5, further comprising the following step before the step of listing the application icon comprising the widget to be an editable mode according to a preset operation performed by a user on the application icon of the wireless communication apparatus which comprises the widget:
    displaying the application icon comprising the widget and a common application icon in different manners.

7. The method of claim 6, wherein the step of displaying the application icon comprising the widget and a common application icon in different manners specifically comprises:
    displaying the application icon comprising the widget in a highlighted, flashing or animation manner, and displaying the common application icon in a normal manner.

8. The method of claim 5, wherein the step of adding a corresponding widget type to a desktop of the wireless communication apparatus specifically comprises:
    comparing a size of an area necessary for the corresponding widget type with a size of an available area of the desktop; and
    adding the corresponding widget type to the desktop if the area necessary for the corresponding widget type is smaller than or equal to the available area of the desktop.

9. The method of claim 8, wherein:
    the step of adding the corresponding widget type to the desktop if the area necessary for the corresponding widget type is smaller than or equal to the available area of the desktop further comprises:
    if the area necessary for the corresponding widget type is smaller than the available area of the desktop, displaying at least one said widget type, of which the area necessary is smaller than the available area of the desktop, for the user selecting to add the widget type that is needed;
    the method further comprises the following step after the step of comparing a size of an area necessary for the corresponding widget type with a size of an available area of the desktop:

prompting that the adding operation of the user fails if the area necessary for the corresponding widget type is larger than the available area of the desktop.

10. The method of claim 5, wherein the preset operation is a long-press operation or a double-clicking operation, and the editing operation is a dragging operation.

11. A wireless communication apparatus, comprising:
an application management module, being configured to list an application icon comprising the widget to be an editable mode according to a preset operation performed by a user on the application icon of the wireless communication apparatus which comprises the widget;
a widget editing module, being configured to zoom in or out the application icon comprising the widget according to an editing operation of the user on the application icon comprising the widget after the application icon comprising the widget is listed to be the editable mode by the application management module;
a monitoring module, being configured to monitor a size of the application icon comprising the widget when the application icon is zoomed in or out by the widget editing module; and
an adding module, being configured to add a corresponding widget type to a desktop of the wireless communication apparatus when the monitoring module monitors that the application icon comprising the widget is zoomed in or out to the corresponding widget type.

12. The wireless communication apparatus of c11, further comprising:

an application displaying module, being configured to display the application icon comprising the widget and a common application icon in different manners.

13. The wireless communication apparatus of claim 11, wherein the adding module specifically comprises:
a comparing unit, being configured to compare a size of an area necessary for the corresponding widget type with a size of an available area of the desktop; and
a processing unit, being configured to add the corresponding widget type to the desktop if the comparing unit determines that the area necessary for the corresponding widget type is smaller than or equal to the available area of the desktop.

14. The wireless communication apparatus of claim 13, wherein the adding module further comprises:
a first prompting unit, being configured to display at least one said widget type, of which the area necessary is smaller than the available area of the desktop, for the user selecting to add the widget type that is needed if the comparing unit determines that the area necessary for the corresponding widget type is smaller than the available area of the desktop, so that the corresponding widget type is added by the processing unit to the desktop; and
a second prompting unit, being configured to prompt that the adding operation of the user fails if the area necessary for the corresponding widget type is larger than the available area of the desktop.

* * * * *